US008731895B2

(12) United States Patent
Anne et al.

(10) Patent No.: US 8,731,895 B2
(45) Date of Patent: May 20, 2014

(54) SYSTEM AND METHOD FOR ACCESSING AND CONFIGURING FIELD DEVICES IN A PROCESS CONTROL SYSTEM

(75) Inventors: Gowtham Anne, Karnataka (IN); Prasad T. S. Raghavendra, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 1400 days.

(21) Appl. No.: 12/123,631

(22) Filed: May 20, 2008

(65) Prior Publication Data

US 2009/0292995 A1  Nov. 26, 2009

(51) Int. Cl.
*G06F 9/455* (2006.01)

(52) U.S. Cl.
USPC .......................................................... 703/23

(58) Field of Classification Search
CPC ........................................................ G06F 9/455
USPC .......................................................... 703/23
See application file for complete search history.

(56) References Cited

U.S. PATENT DOCUMENTS

| 6,105,119 | A | 8/2000 | Kerr et al. |
|---|---|---|---|
| 6,179,489 | B1 | 1/2001 | So et al. |
| 6,298,377 | B1 | 10/2001 | Hartikainen et al. |
| 6,618,745 | B2 * | 9/2003 | Christensen et al. ......... 709/201 |
| 6,807,523 | B1 | 10/2004 | Wensink et al. |
| 7,110,843 | B2 | 9/2006 | Pagnano et al. |
| 2002/0087308 | A1 | 7/2002 | Ozawa |
| 2002/0104586 | A1 | 8/2002 | Morikawa et al. |
| 2002/0120723 | A1 | 8/2002 | Forth et al. |
| 2002/0161940 | A1 | 10/2002 | Eryurek et al. |
| 2003/0135563 | A1 | 7/2003 | Bodin et al. |
| 2004/0165544 | A1 | 8/2004 | Cornett et al. |
| 2004/0167750 | A1 | 8/2004 | Pagnano et al. |
| 2004/0259533 | A1 | 12/2004 | Nixon et al. |
| 2006/0140209 | A1 * | 6/2006 | Cassiolato et al. ............ 370/466 |
| 2006/0217822 | A1 | 9/2006 | Ramanathan et al. |
| 2007/0100471 | A1 | 5/2007 | Kumar et al. |
| 2007/0283072 | A1 * | 12/2007 | Johnson ........................ 710/305 |

(Continued)

FOREIGN PATENT DOCUMENTS

WO      WO 03/075206 A2     9/2003

OTHER PUBLICATIONS

UART (Universal Asynchronous Receiver/Transmitter), WhatIs. com, accessed online Sep. 26, 2013, p. 1.*
Robert Itschner et al., "Glass Remote Monitoring of Embedded Systems in Power Engineering", 1998, IEEE Internet Computing, IEEE service Center, pp. 46-52.*

(Continued)

*Primary Examiner* — Kandasamy Thangavelu
*Assistant Examiner* — Juan Ochoa

(57) ABSTRACT

A system includes a client that presents a user interface to a user, where the user interface is associated with a field device in a process control system. The system also includes an interface component having (i) an emulator that emulates a device manager associated with at least the field device and (ii) a communication manager that communicates with the field device over a communication link using a specified protocol. The system further includes a server that provides a request to the emulator based on input from the user provided through the user interface, where the emulator provides the request to the communication manager for communication to the field device. The communication manager could include a communication DTM, and the emulator could emulate at least some functions of a device DTM. A device description (such as a DD/EDD file) could also be used to generate the user interface.

23 Claims, 3 Drawing Sheets

(56) References Cited

U.S. PATENT DOCUMENTS

| | | |
|---|---|---|
| 2008/0235001 A1 | 9/2008 | Cohen et al. |
| 2009/0035740 A1 | 2/2009 | Reed et al. |
| 2009/0036111 A1 | 2/2009 | Danford et al. |
| 2009/0150130 A1 | 6/2009 | Ludwig |
| 2009/0259612 A1 | 10/2009 | Hanson |
| 2009/0292524 A1 | 11/2009 | Anne et al. |
| 2009/0292996 A1 | 11/2009 | Anne et al. |

OTHER PUBLICATIONS

Kastner et al., "EDDL inside FDT/DTM", Sep. 22-24, 2004, Factory Communication Systems, IEEE International Workshop, pp. 365-368.*

Office Action dated Nov. 16, 2010 in connection with U.S. Appl. No. 12/123,658.

Office Action dated Jun. 21, 2011 in connection with U.S. Appl. No. 12/123,680.

* cited by examiner

SYSTEM AND METHOD FOR ACCESSING AND CONFIGURING FIELD DEVICES IN A PROCESS CONTROL SYSTEM

CROSS-REFERENCE TO RELATED APPLICATIONS

This disclosure is related to the following U.S. patent applications:

U.S. patent application Ser. No. 12/123,658 entitled "SYSTEM AND METHOD FOR ACCESSING AND PRESENTING HEALTH INFORMATION FOR FIELD DEVICES IN A PROCESS CONTROL SYSTEM"; and U.S. patent application Ser. No. 12/123,680 entitled "SYSTEM AND METHOD FOR ACCESSING AND CONFIGURING FIELD DEVICES IN A PROCESS CONTROL SYSTEM USING DISTRIBUTED CONTROL COMPONENTS".

All of these patent applications are hereby incorporated by reference.

TECHNICAL FIELD

This disclosure relates generally to process control systems and more specifically to a system and method for accessing and configuring field devices in a process control system.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

Conventional process control systems routinely include a large number of field devices, such as sensors and actuators. Communications with field devices often occur using various standard or other protocols, such as HART, FOUNDATION Fieldbus, or PROFIBUS. These types of protocols often support the use of a structured language called the Electronic Device Description Language ("EDDL"), which is defined in the IEC 61804-3 standard. This language can be used to create device description or electronic device description ("DD/EDD") files, which describe the online functional behavior of the field devices. The DD/EDD files can be interpreted by a host application and used to control interactions with and configuration of the field devices.

Another standard technology used with field devices is Field Device Tool/Device Type Manager ("FDT/DTM") technology, which is defined in the IEC/PAS 62453 standard. This technology defines components that support "plug-and-play" use of field devices. For example, a device DTM is a component that defines a field device's configuration, and it includes a user interface for interacting with the field device. A communication DTM is a component that defines an interface for communicating with a field device using a specific protocol. Multiple communication DTMs could be provided to support communications using different protocols. A communication DTM interfaces with the host application through a field device's device DTM. As a result, the host application can merely create an instance of the appropriate device DTM and link the device DTM with the appropriate communication DTM. At this point, the host application can communicate with the field device, and the user can interact with the field device.

SUMMARY

This disclosure provides a system and method for accessing and configuring field devices in a process control system.

In a first embodiment, a method includes generating a request associated with a field device in a process control system. The method also includes providing the request to an emulator, where the emulator emulates a device manager associated with at least the field device. The method further includes providing the request from the emulator to a communication manager. The communication manager is configured to communicate the request to the field device over a communication link using a specified protocol.

In particular embodiments, the communication manager includes a communication Device Type Manager (DTM), and the emulator emulates at least some functions of a device DTM.

In other particular embodiments, the field device is associated with a device description. Also, the method includes generating a user interface for a user, where the user interface is based on the device description. The device description could represent a device description or electronic device description (DD/EDD) file.

In yet other particular embodiments, providing the request to the emulator includes providing the request to a converter, converting the request into a specified format, and providing the request with the specified format to the emulator. The method can also include receiving a response to the request from the field device through the communication manager and the emulator, extracting data from the response, and updating the user interface based on the extracted data.

In still other particular embodiments, the request is associated with a configuration of the field device, and the response indicates whether the field device has been configured as requested.

In additional particular embodiments, both the device manager and the emulator are available for communicating with the field device. The method also includes selecting one of the device manager and the emulator. The selection could involve receiving a selection of one of the device manager and the emulator from a user. In addition, the method could further include providing a second request from the device manager to the communication manager and providing the second request from the communication manager to the field device (without using the emulator when the device manager is selected).

In a second embodiment, an apparatus includes an emulator configured to emulate at least one device manager associated with at least one field device in a process control system. The apparatus also includes a plurality of communication managers, where each communication manager is configured to communicate with the at least one field device over a communication link using a specified protocol. The emulator is configured to receive a request for the at least one field device and to provide the request to one of the communication managers for communication to the field device.

In a third embodiment, a system includes a client configured to present a user interface to a user, where the user interface is associated with a field device in a process control system. The system also includes an interface component having (i) an emulator configured to emulate a device manager associated with at least the field device and (ii) a communication manager configured to communicate with the field device over a communication link using a specified protocol. The system further includes a server configured to provide a request to the emulator based on input from the user provided through the user interface, where the emulator is configured to provide the request to the communication manager for communication to the field device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
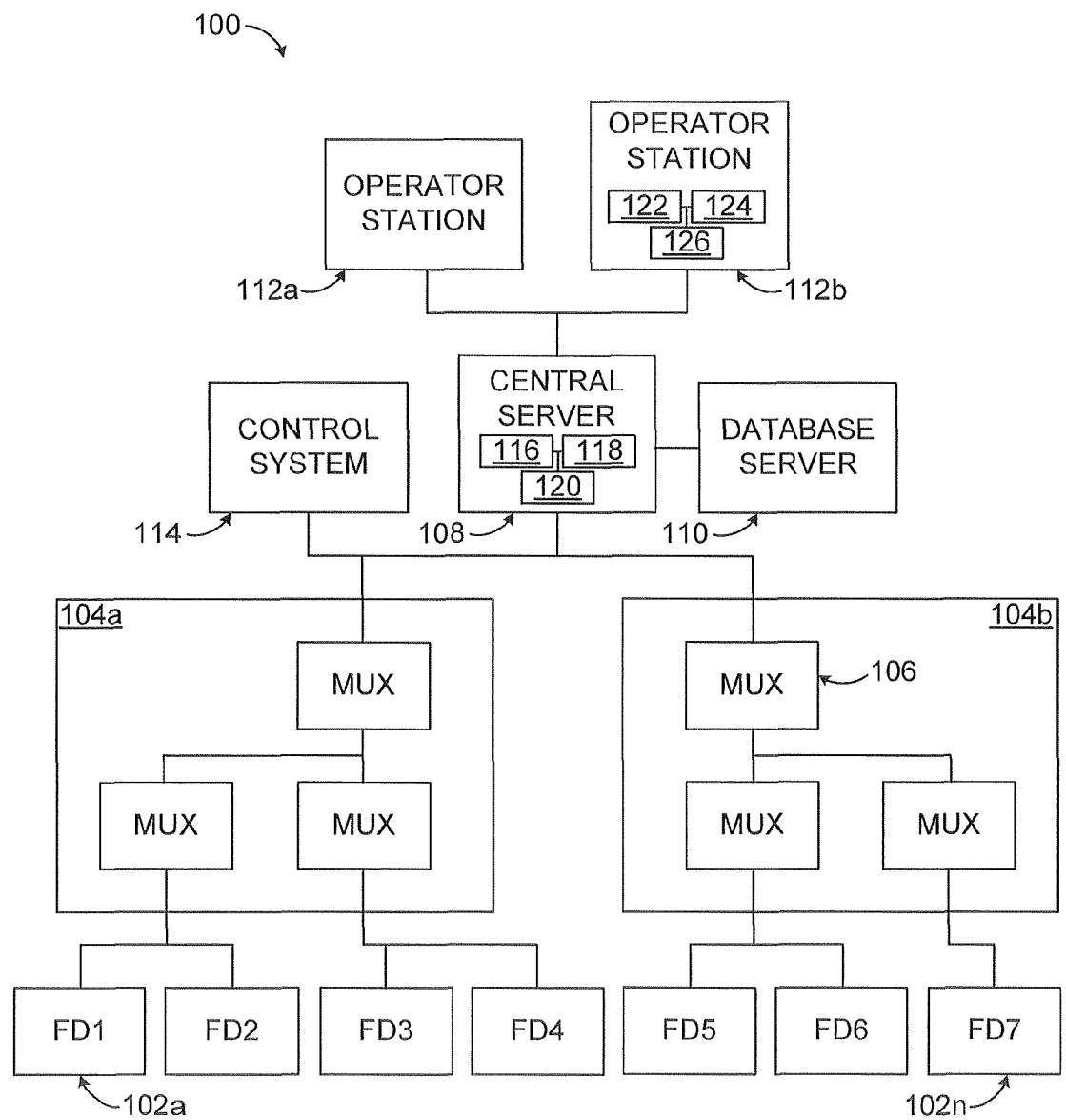
FIG. 1 illustrates an example process control system according to this disclosure.
Figure 2:
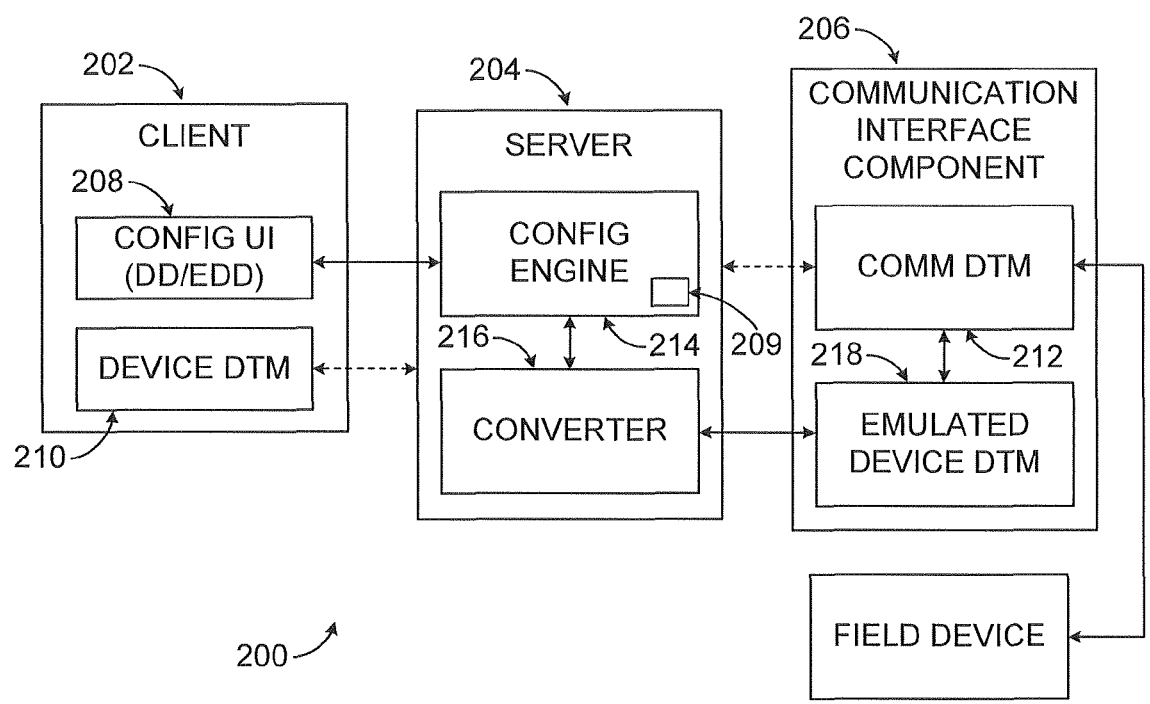
FIG. 2 illustrates an example mechanism for configuring a field device according to this disclosure.
Figure 3:
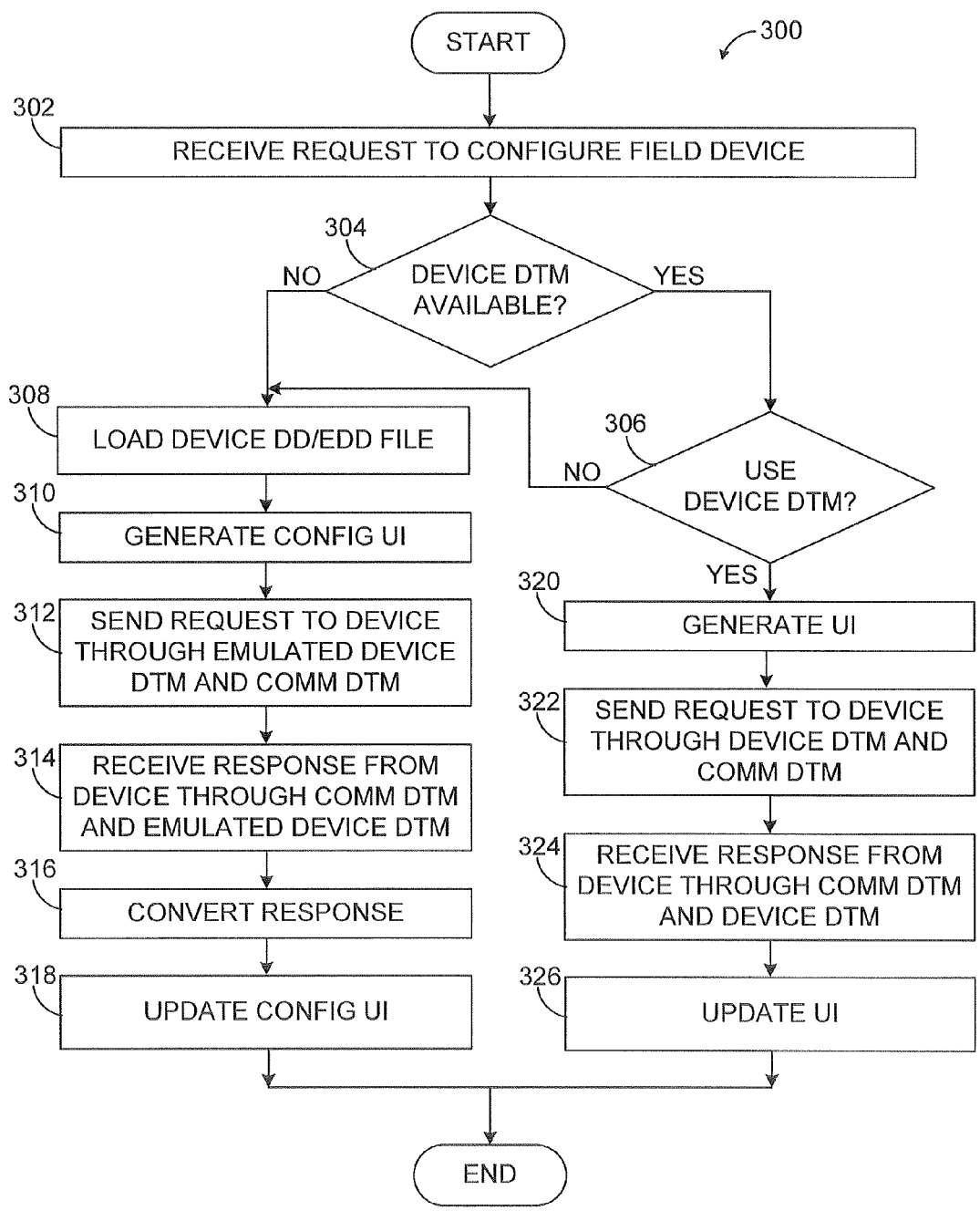
FIG. 3 illustrates an example method for configuring a field device according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates an example process control system 100 according to this disclosure. The embodiment of the process control system 100 shown in FIG. 1 is for illustration only. Other embodiments of the process control system 100 could be used without departing from the scope of this disclosure.

As shown in FIG. 1, the process control system 100 includes various field devices 102a-102n. The field devices 102a-102n represent devices that can perform a wide variety of functions in the process control system 100. The field devices 102a-102n are used to implement desired control strategies in the process control system 100. For example, the field devices 102a-102n could include sensors that measure a wide variety of characteristics in a process system, such as temperature, pressure, or flow rate. The field devices 102a-102n could also include actuators that alter a wide variety of characteristics in the process system, such as valves or heaters. The field devices 102a-102n could include any other or additional components in any suitable process system. Each of the field devices 102a-102n includes any suitable structure for performing one or more functions to implement at least one control strategy. Also, a process system may generally represent any system or portion thereof configured to process one or more products or other materials in some manner.

Each of the field devices 102a-102n is coupled to one of multiple control networks 104a-104b in this example. Each of the control networks 104a-104b generally transports control signals and other data to and from the field devices 102a-102n. Each of the control networks 104a-104b includes any suitable structure(s) facilitating interaction with one or more field devices. Also, each of the control networks 104a-104b could support any suitable protocol or protocols for communicating with one or more of the field devices 102a-102n. These protocols could include HART, FOUNDATION Fieldbus, PROFIBUS, or other protocol(s). In addition, each of the control networks 104a-104b could have any suitable network topology, and the field devices can be connected in any suitable manner to the control networks 104a-104b.

In this example, each of the control networks 104a-104b includes multiple multiplexers 106. The multiplexers 106 support communications with multiple field devices over shared communication links. For example, each of the multiplexers 106 can receive signals from multiple field devices (either directly or through other multiplexers) and multiplex the signals onto a single communication link. Each of the multiplexers 106 can also receive signals over the single communication link and de-multiplex the signals for forwarding to the field devices. The destination for specific signals transmitted through the multiplexers 106 may be determined in any suitable manner, such as based on destination addresses contained in the signals. Each of the multiplexers 106 includes any suitable structure for multiplexing and demultiplexing signals. It may be noted that the use of multiplexers 106 in the control networks 104a-104b is for illustration only. The control networks 104a-104b could include any suitable components in any suitable configuration, such as various controllers and inputs/outputs in a distributed control system (DCS).

A central server 108 is coupled to the control networks 104a-104b. The central server 108 transmits data to and receives data from the field devices 102a-102n over the control networks 104a-104b. For example, the central server 108 could send status requests to the field devices 102a-102n and receive corresponding status or diagnostic information from the field devices 102a-102n. The status information could identify a status of a field device, and the diagnostic information could identify any specific problems with the field device. The central server 108 could also send configuration requests for configuring the field devices 102a-102n over the control networks 104a-104b. Any other or additional information may be transmitted to or received from the field devices 102a-102n. The central server 108 includes any hardware, software, firmware, or combination thereof facilitating access or control over one or more field devices. In particular embodiments, the central server 108 represents a computing device executing a MICROSOFT WINDOWS operating system.

A database server 110 is coupled to the central server 108. The database server 110 stores various information used, generated, or collected by the central server 108. For example, the central server 108 could use a device description (such as a device description/electronic device description or "DD/EDD" file) to issue requests to a field device, and the device description could be stored in the database server 110. Also, the central server 108 could retrieve status or diagnostic information associated with a field device and store the data in the database server 110. The database server 110 could store any other or additional information. The database server 110 includes any suitable structure facilitating storage and retrieval of information.

One or more operator stations 112a-112b are coupled to the central server 108. The operator stations 112a-112b represent computing or communication devices providing user access to the central server 108. The operator stations 112a-112b facilitate various interactions with users. For example, the operator stations 112a-112b could allow users to view information about and configure field devices through user interfaces provided by the central server 108. The operator stations 112a-112b could also allow users to review data collected or generated by the central server 108, such as status and diagnostic information retrieved from the field devices. Each of the operator stations 112a-112b includes any hardware, software, firmware, or combination thereof for supporting user access and control of the system 100. In particular embodiments, the operator stations 112a-112b represent computing devices executing a MICROSOFT WINDOWS operating system.

A control system 114 is also coupled to the control networks 104a-104b. The control system 114 represents a device or collection of devices that can control the operation of the field devices 102a-102n. For example, the control system 114 could receive data from certain field devices (such as sensors) and generate control signals for adjusting other field devices (such as actuators). The control system 114 generally represents any suitable hardware, software, firmware, or combination thereof for controlling the operation of one or more field devices and communication links between the field devices and the control system.

In particular embodiments, the central server 108 could include one or more processors 116 and one or more memories 118 configured to store instructions and data used, generated, or collected by the processor(s). The central server 108 could also include one or more interfaces 120 for communicating with external networks, devices, or systems, such as an Ethernet, HART, FOUNDATION Fieldbus, PROFIBUS, MODBUS, DEVICE-NET, or CAN interface. Similarly, each of the operator stations 112a-112b could include one or more processors 122 and one or more memories 124 storing instructions and data used, collected, or generated by the processor(s). The operator stations 112a-112b could also include one or more interfaces 126 for communicating with external networks or systems, such as an Ethernet interface.

In one aspect of operation, communications between the operator stations 112a-112b and the field devices 102a-102n occur through the central server 108 using one or more mechanisms. These mechanisms include Electronic Device Description Language ("EDDL") technology or Field Device Tool/Device Type Manager ("FDT/DTM") technology. The EDDL technology generally uses DD/EDD files, which define the online functional behavior of field devices. The FDT/DTM technology generally involves the use of communication DTMs accessible through device DTMs. Different communication DTMs are often provided to support communications over different types of networks (such as multiplexer networks or other types of control networks), and different device DTMs can be used to facilitate communications with specific field devices or types of field devices.

The use of FDT/DTM technology can provide various benefits, such as the abstraction of specific communication mechanisms and protocols (used to communicate with field devices) from a host application. The host application can simply select the proper communication DTM for a particular field device and use the field device's device DTM to communicate through that communication DTM. However, device DTMs may not be available for various field devices. For example, device DTMs are routinely provided by a vendor or manufacturer of a field device, and not all vendors and manufacturers provide device DTMs for their field devices. In other situations, the use of DD/EDD files may be preferred or desired over the use of FDT/DTM technology.

In accordance with this disclosure, if a device DTM is not available for a field device, a device DTM can be emulated in the system 100. This may allow DTM technology to be used to configure the field device. Also, if both technologies (EDDL and FDT/DTM) are available for use with a field device, a user could be given the option of selecting one of these technologies. In this way, DTM technology could be used in the system 100 even with field devices that lack the proper device DTMs or with field devices where the use of EDDL might be desired or preferred. Additional details regarding this functionality are provided below.

Although FIG. 1 illustrates one example of a process control system 100, various changes may be made to FIG. 1. For example, the process control system 100 could include any number of field devices, control networks, servers, operator stations, and control systems. Also, the makeup and arrangement of the control networks 104a-104b are for illustration only. The control networks 104a-104b may or may not include multiplexers, and the control networks 104a-104b could include any suitable components in any suitable configuration. In addition, FIG. 1 illustrates one operational environment in which FDT/DTM components can be emulated to support access to and configuration of field devices. This functionality could be used with any suitable devices and in any suitable systems.

FIG. 2 illustrates an example mechanism 200 for configuring a field device according to this disclosure. The embodiment of the mechanism 200 shown in FIG. 2 is for illustration only. Other embodiments of the mechanism 200 could be used without departing from the scope of this disclosure.

As noted above, EDDL allows DD/EDD files to be created that generally define the online functional behavior of field devices. Communications with the field devices can then occur in accordance with the DD/EDD files over standard or proprietary communication interfaces. In contrast, FDT/DTM provides access to field devices using device DTMs and communication DTMs. The communication DTM interfaces with a host application through the device DTM, which allows the host application to communicate with the field device through the communication DTM and the device DTM.

As shown in FIG. 2, a mechanism 200 is provided that enables the use of device descriptions (such as DD/EDD files) and emulated device managers (such as emulated device DTMs) to communicate with field devices. This mechanism 200 could be used when a field device lacks an associated device DTM or when the use of EDDL is preferred or desired over an existing device DTM (for whatever reason).

In FIG. 2, the mechanism 200 includes three main components: a client 202, a server 204, and a communication interface component 206. The client 202 could represent one of the operator stations 112a-112b in FIG. 1. The server 204 could represent the central server 108 in FIG. 1. The communication interface component 206 could represent a component executed by the central server 108 or the field device or a component that is located between the central server 108 and a particular field device. In general, it may be noted that multiple ones of these components 202-206 could be implemented on a single physical component or on different physical components. Each of these components 202-206 could include any suitable hardware, software, firmware, or combination thereof for performing the functions described below.

The client 202 in this example may include or support a configuration user interface ("UI") 208 and/or a device DTM 210. The configuration user interface 208 represents an interface derived by the server 204 parsing a DD/EDD file 209. The device DTM 210 defines an interface and allows communications with a field device through an appropriate communication DTM. Depending on the implementation, the client 202 could include the configuration user interface 208, the device DTM 210, or both.

When only the device DTM 210 is present, configuration of a field device may occur as follows. The client 202 loads the device DTM 210, and a connection request is instantiated and sent to an appropriate communication DTM 212 in the communication interface component 206 through the server 204. The communication DTM 212 defines the interface for communicating with the field device using a specific protocol (and often a specific type of communication link). Different communication DTMs 212 could be provided in the communication interface component 206 to support different communication protocols and homogenous or heterogeneous communication links (such as HART over PROFIBUS). If a successful connection with the appropriate communication DTM 212 is made, the device DTM 210 can engage in further data exchange using sequences of requests defined in the FDT/DTM specification. The communication DTM 212 acts as an interface to the field device and allows a user, through the device DTM 210, to view information about and configure the field device. The data exchanged between the device DTM 210 and the communication DTM 212 could have any suitable form, such as extensible Markup Language ("XML") documents.

When only the DD/EDD file 209 for the field device is present, the client 202 is unable to interact directly with the communication DTM 212 because the client 202 lacks or is not using a valid device DTM (and communication DTMs are designed specifically to interact with device DTMs). In this situation, configuration of a field device may occur as follows. A configuration engine 214 in the server 204 can load and parse the field device's DD/EDD file 209 to generate the configuration user interface 208, which is presented to the user through the client 202. The configuration engine 214 can also instantiate a connection request that is sent to the appropriate communication DTM 212 via an emulated device DTM 218.

If a successful connection with the appropriate communication DTM 212 is made, the user can use the configuration user interface 208 to cause the configuration engine 214 to issue requests for performing various functions (such as to configure the field device) The configuration engine 214 issues the proper requests, and a converter 216 formats the requests into an XML format or other format suitable for FDT/DTM. The converted requests are then sent to the emulated device DTM 218 in the communication interface component 206. The emulated device DTM 218 represents an emulator that emulates or impersonates one or more types of device DTMs. The emulated device DTM 218 sends the requests to the communication DTM 212, which accepts the requests since they appear to originate from a valid device DTM. The communication DTM 212 therefore forwards the requests to the field device for execution. Similarly, if data is received from the field device, the data passes from the communication DTM 212 to the emulated device DTM 218 and then to the converter 216, which extracts data from the FDT/DTM formatted data. The extracted data is provided to the configuration engine 214, and the configuration engine 214 can process the data and update the user through the configuration user interface 208 (such as by presenting the extracted data to the user).

When both the DD/EDD file 209 and the device DTM 210 are present, the user using the client 202 could be given the option of selecting which one is used to communicate with and configure the field device. For example, the user could manually select whether the DD/EDD file 209 or the device DTM 210 is used to transmit certain requests to the field device. The selection of the DD/EDD file 209 or the device DTM 210 could also be made automatically, such as by using business logic or other logic that selects which is used based on the type of operation the user wishes to perform.

In this way, it appears to the communication DTM 212 that it is constantly communicating with a valid device DTM (whether an actual device DTM 210 or an emulated device DTM 218). As a result, the communication DTM 212 accepts requests and interacts with a field device in the requested manner, regardless of whether the DD/EDD file 209 or the device DTM 210 is used. At least some of the benefits associated with the use of FDT/DTM technology are therefore realized, even if no actual device DTM is used.

The configuration engine 214 includes any hardware, software, firmware, or combination thereof for issuing configuration or other requests for at least one field device using at least one DD/EDD file. The converter 216 includes any hardware, software, firmware, or combination thereof for converting between an FDT/DTM format and a non-FDT/DTM format. The emulated device DTM 218 includes any hardware, software, firmware, or combination thereof for emulating at least some functions of at least one device DTM. It may be noted that a single emulated device DTM 218 could be used to emulate one or multiple types of device DTMs, or multiple emulated device DTMs 218 could be used. The communication interface component 206 can execute one or more FDT Frame interfaces that host the communication DTMs 212. The device DTM 210 includes any hardware, software, firmware, or combination thereof for providing a user interface for configuring a field device. The communication DTM 212 includes any hardware, software, firmware, or combination thereof for enabling communication with a field device using a particular type of communication link or protocol.

Although FIG. 2 illustrates one example of a mechanism 200 for configuring a field device, various changes may be made to FIG. 2. For example, as noted above, the client 202 may provide one or both of the components 208-210. Also, the client 202 could present any number of configuration user interfaces 208 or include any number of device DTMs 210. In addition, the communication interface component 206 could include any number of communication DTMs 212 or emulated device DTMs 218.

FIG. 3 illustrates an example method 300 for configuring a field device according to this disclosure. The embodiment of the method 300 shown in FIG. 3 is for illustration only. Other embodiments of the method 300 could be used without departing from the scope of this disclosure.

A request to configure a field device is received at step 302. This could include, for example, a user submitting a request to configure a field device 102a-102n in the process control system 100. The request could be submitted to the client 202, which may operate on or represent one of the operator stations 112a-112b in the process control system 100.

In response to the request, a determination is made whether a device DTM is available for the field device at step 304. This could include, for example, the client 202 or the server 204 determining whether a device DTM is available for a specific field device or for a group of field devices.

If a device DTM is available, the user is given the option of using the device DTM at step 306. This could include, for example, the client 202 or the server 204 presenting an option on a graphical display to the user. The option could allow the user to select either the device DTM or a DD/EDD file for the field device being configured. The user could then select which mechanism to use when configuring the field device.

If a device DTM is not available or if the user chooses not to use an available device DTM, a DD/EDD file for the field device is loaded at step 308. This could include, for example, the server 204 loading the DD/EDD file 209 for the field device into the configuration engine 214. A configuration user interface is generated and presented to the user at step 310. This could include, for example, the configuration engine 214 parsing the DD/EDD file 209 and determining how the field device can be configured. The configuration engine 214 could then generate a user interface that allows the field device to be configured in the identified ways. As a particular example, the configuration engine 214 can use the DD/EDD file 209 to identify the parameters of the field device that can be adjusted by the user, and the user interface could identify those parameters as being available for configuration.

When the user attempts to configure the field device through the user interface, a request is sent to the field device through an emulated device DTM and a communication DTM at step 312. This could include, for example, the configuration engine 214 receiving a configuration request from the user and issuing a corresponding command or other request. The request can be formatted into FDT/DTM XML format by the converter 216. The request is routed to the communication DTM 212 through the emulated device DTM 218, so the communication DTM 212 accepts the request and sends it to the field device. A response to the request is received through the communication DTM and the emulated device DTM at step 314. The response could indicate whether the attempted configuration of the field device was successful. The response is converted at step 316. This could include, for example, the converter 216 extracting the relevant data from the XML-formatted response and providing the extracted data to the configuration engine 214. The configuration user interface is then updated at step 318. This could include, for example, the configuration engine 214 updating the user interface to reflect the results of the attempted field device configuration. The update could occur in a manner based on the DD/EDD file 209 for the specified field device.

If the user wishes to use an available device DTM at step 306, a user interface is generated and presented to the user at step 320. The user interface is defined by the device DTM. When the user attempts to configure the field device through the user interface, a request is sent to the field device through the device DTM and the communication DTM at step 322. A response to the request is received through the communication DTM and the device DTM at step 324, and the user interface is updated at step 326. In this case, the available device DTM 210 is used in its normal manner with the communication DTM 212. The device DTM 210 defines the user interface, and the device DTM 210 can route requests to and receive responses from the communication DTM 212.

In this way, the user can be given the option of using an appropriate mechanism (DD/EDD or FDT/DTM) to configure a field device if both mechanisms are available. Also, the use of the emulated device DTM 218 allows many of the benefits of FDT/DTM technology to be obtained (since the communication DTM 212 is used to communicate with the field device). These benefits can be obtained even when an actual device DTM 210 is not available for the specified field device or when the use of EDDL is preferred or desired in a given situation.

Although FIG. 3 illustrates one example of a method 300 for configuring a field device, various changes may be made to FIG. 3. For example, other types of determinations or criteria could be used to select the use of the DD/EDD file 209 or the device DTM 210. As a particular example, a determination could be made whether a DD/EDD file 209 is available, and a device DTM 210 could be automatically selected when the DD/EDD file 209 is not available. Also, if both the DD/EDD file 209 and the device DTM 210 are available, one of these mechanisms could be automatically selected rather than requiring user input. In addition, while shown as a series of steps, various steps in FIG. 3 could overlap, occur in parallel, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory ("ROM"), random access memory ("RAM"), a hard disk drive, a compact disc ("CD"), a digital video disc ("DVD"), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   determining whether a device manager for a field device in a process control system is available, the device manager configured to define a configuration of the field device; and
   in response to determining that the device manager for the field device is unavailable:
     generating a user interface based on a device description and configuration parameters associated with the field device, the device description for the field device including a device description or electronic device description (DD/EDD) file, the DD/EDD file including the configuration parameters for the field device;
     receiving, via the user interface, a request associated with the field device;
     providing the request to an emulator, the emulator emulating the device manager for the field device; and
     providing the request from the emulator to a communication device type manager (DTM) using an emulated device DTM,
   wherein the communication DTM is configured to communicate the request to the field device over a communication link using a specified protocol.

2. The method of claim 1, wherein:
   the device manager comprises a device DTM; and
   the emulated device DTM emulates at least some functions of the device DTM.

3. The method of claim 1, further comprising:
   in response to determining that the device manager for the field device is available, receiving the request via the device manager and providing the request from the device manager to the communication DTM.

4. The method of claim 1, further comprising:
identifying the configuration parameters for the field device from the DD/EDD file.

5. The method of claim 1, wherein providing the request to the emulator comprises:
providing the request to a converter;
converting the request into a specified format; and
providing the request with the specified format to the emulator.

6. The method of claim 5, further comprising:
receiving a response to the request from the field device through the communication DTM and the emulator;
extracting data from the response; and
updating the user interface based on the extracted data.

7. The method of claim 6, wherein:
the request is associated with the configuration of the field device; and
the response indicates whether the field device has been configured as requested.

8. The method of claim 1, further comprising:
in response to determining that both the device manager and the emulator are available for communicating with the field device, selecting one of the device manager and the emulator.

9. The method of claim 8, further comprising:
receiving a selection of one of the device manager and the emulator from a user.

10. The method of claim 8, further comprising:
providing a second request from the device manager to the communication DTM without using the emulator when the device manager is selected; and
providing the second request from the communication DTM to the field device.

11. The method of claim 1, wherein determining whether the device manager for the field device is available comprises:
determining whether the device manager has been provided for the field device;
determining whether the communication DTM can communicate with the device manager; and
determining that the device manager for the field device is unavailable in response to at least one of: the device manager not being provided for the field device and the communication DTM not being able to communicate with the device manager.

12. An apparatus comprising:
one or more processing devices configured to execute program code to implement:
an emulator configured to emulate at least one device manager associated with at least one field device in a process control system, wherein the at least one device manager is configured to define a configuration of the at least one field device; and
a plurality of communication managers, at least one of the communication managers comprising a communication device type manager (DTM) configured to communicate with the at least one field device over a communication link using a specified protocol;
wherein, when the at least one device manager for the at least one field device is unavailable, the emulator is configured to:
receive a request for the at least one field device via a user interface generated based on a device description and configuration parameters associated with the at least one field device, the device description for the at least one field device including a device description or electronic device description (DD/EDD) file, the DD/EDD file including the configuration parameters for the at least one field device; and
provide, using an emulated device DTM, the request to the communication DTM for communication to the at least one field; device;
wherein the apparatus com rises one or more process n devices configured to execute program code to implement functions of the emulator and the communication managers.

13. The apparatus of claim 12, wherein:
the communication managers comprise multiple communication DTMs configured to communicate with the at least one field device using at least one of: different communication links and different protocols;
the at least one device manager comprises at least one device DTM; and
the emulated device DTM is configured to emulate at least some functions of the at least one device DTM.

14. The apparatus of claim 12, wherein:
the request is associated with the configuration of the at least one field device; and
the emulator is further configured to receive a response from the at least one field device through one of the communication managers, the emulator configured to provide the response to a converter configured to extract data from the response, the response indicating whether the at least one field device has been configured as requested.

15. The apparatus of claim 12, wherein:
when both the at least one device manager and the emulator are available for communicating with the at least one field device, at least one of the communication managers is further configured to receive a second request from the at least one device manager for communication to the at least one field device without using the emulator.

16. The apparatus of claim 12, wherein the at least one device manager for the at least one field device is unavailable when at least one of: the at least one device manager is not provided for the at least one field device and the communication DTM is not able to communicate with the at least one device manager.

17. A system comprising:
a client configured to present a user interface to a user, the user interface associated with a field device in a process control system;
an interface component comprising (i) an emulator configured to emulate a device manager associated with at least the field device and (ii) a communication device type manager (DTM) configured to communicate with the field device over a communication link using a specified protocol, wherein the device manager is configured to define a configuration of the field device; and
a server configured to determine whether the device manager for the field device is available and, in response to determining that the device manager for the field device is unavailable, to:
cause the client to generate the user interface based on a device description and configuration parameters associated with the field device, the device description for the field device including a device description or electronic device description (DD/EDD) file, the DD/EDD file including the configuration parameters for the field device;

receive, via the user interface, a request associated with the field device; and provide the request to the emulator;

wherein the emulator is configured to provide, using an emulated device DTM, the request to the communication DTM for the device manager that is unavailable for communication to the field device.

18. The system of claim 17, wherein the request is associated with the configuration of the field device.

19. The system of claim 18, wherein the server is further configured, in response to determining that the device manager for the field device is available, to receive the request via the device manager and provide the request from the device manager to the communication DTM.

20. The system of claim 17, wherein:

the interface component is configured to receive a response to the request from the field device; and the server comprises a converter configured to convert the request into a format suitable for the communication DTM and to extract data from the response, the server configured to update the user interface based on the extracted data.

21. The system of claim 17, wherein:

when both the device manager and the emulator are available for communicating with the field device, the communication DTM is further configured to receive a second request from the device manager for communication to the field device without using the emulator.

22. The system of claim 21, wherein at least one of the client and the server is further configured to automatically select the device description or the device manager for use in communicating with the field device.

23. The system of claim 17, wherein the server is configured to determine whether the device manager for the field device is available by:

determining whether the device manager has been provided for the field device;

determining whether the communication DTM can communicate with the device manager; and determining that the device manager for the field device is unavailable in response to at least one of: the device manager not being provided for the field device and the communication DTM not being able to communicate with the device manager.

* * * * *